INVENTOR.
ARTHUR C. HUPP

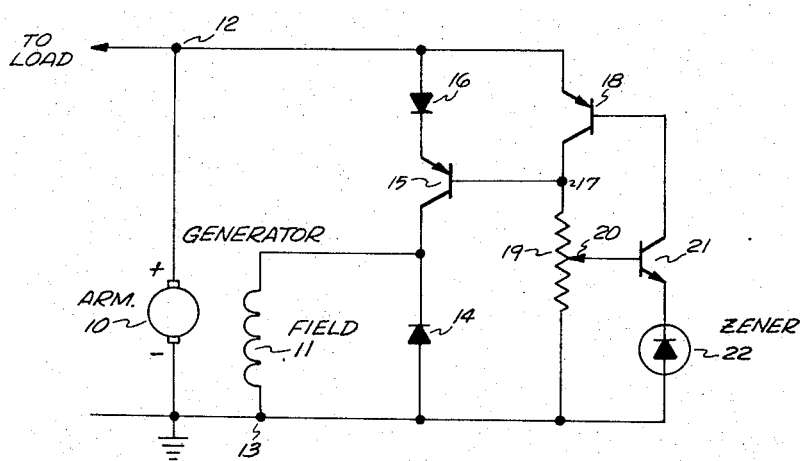
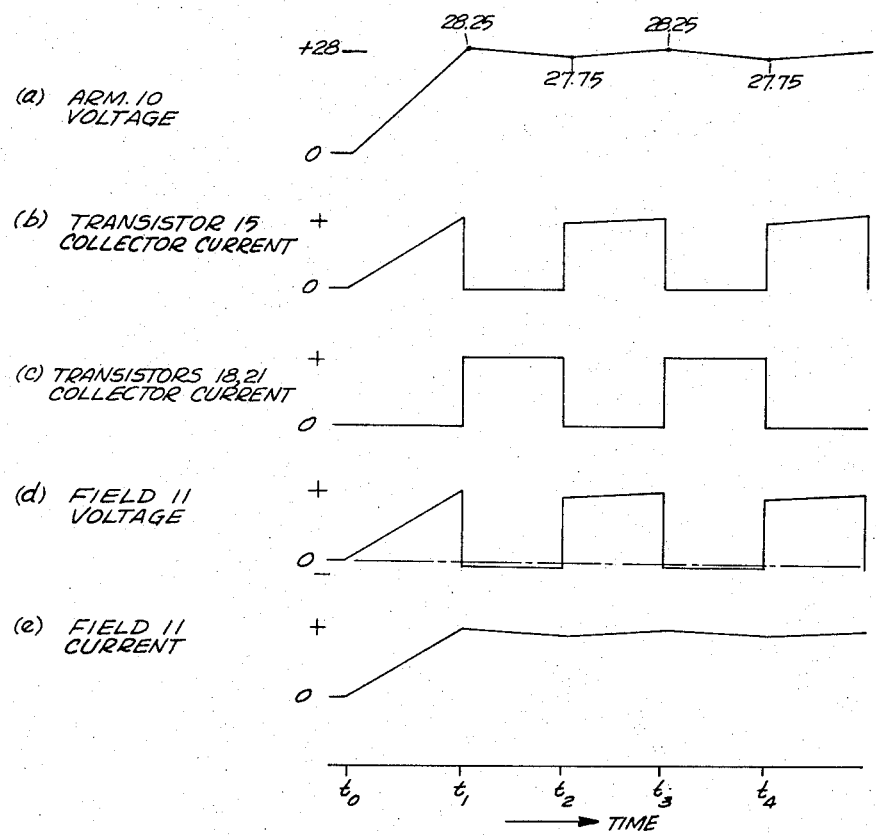
FIG. 2
INVENTOR.
ARTHUR C. HUPP
BY *James G. Williams*
HIS ATTORNEY

United States Patent Office 3,370,219
Patented Feb. 20, 1968

3,370,219
VOLTAGE REGULATOR WITH REGENERATIVE ACTION
Arthur C. Hupp, Waynesboro, Va., assignor to General Electric Company, a corporation of New York
Filed June 18, 1964, Ser. No. 376,002
3 Claims. (Cl. 322—28)

ABSTRACT OF THE DISCLOSURE

A voltage regulator for a generator is provided which utilizes DC coupling and regenerative action for immediate correction of generator voltage in response to generator voltage change. A first transistor supplies current to the generator field when generator output voltage is lower than desired. As generator voltage rises above a reference voltage second and third regeneratively coupled transistors are turned on which cause the first transistor to turn off. As generator voltage falls below the desired level the cycle repeats.

The invention relates to a voltage regulator, and particularly to a voltage regulator for a generator.

In electrical systems, particularly in direct current power systems for aircraft, there is an increasing demand for better voltage regulation. Further, there is an increasing demand for better voltage regulation by means that utilize static or solid state devices which operate over a relatively wide temperature range.

Accordingly, an object of the invention is to provide an improved and novel voltage regulator for a generator.

Another object of the invention is to provide an improved voltage regulator that utilizes solid state devices which are temperature compensated.

Another object of the invention is to provide an improved voltage regulator that can regulate a direct current system voltage on the basis of the generator voltage or on the basis of the load voltage.

Briefly, the invention comprises a first current path having a first transistor for supplying current to the field of the system generator in response to the system voltage magnitude being below a reference voltage magnitude. The invention further comprises a second current path having two regeneratively coupled transistors that conduct in response to the system voltage magnitude exceeding the reference voltage magnitude. The second current path is coupled to the first current path so that when the second current path conducts, the first current path stops conducting and field current is not supplied. The two regeneratively coupled transistors stop conducting in response to the magnitude of the system voltage falling below the magnitude of the reference voltage. Thus, the two current paths alternately conduct with the first path supplying field current when the system voltage is below the reference voltage, and with the second path conducting current to stop conduction in the first path (and thus not supply field current) when the system voltage is above the reference voltage.

The invention is particularly pointed out in the claims. The invention may be better understood from the following description given in connection with the accompanying drawing, in which:

FIGURE 1 shows a circuit diagram of one embodiment of the voltage regulator in accordance with the invention;

FIGURE 2 shows waveforms a, b, c, d and e for explaining the operation of the circuit diagram of FIGURE 1.

Figure 3:
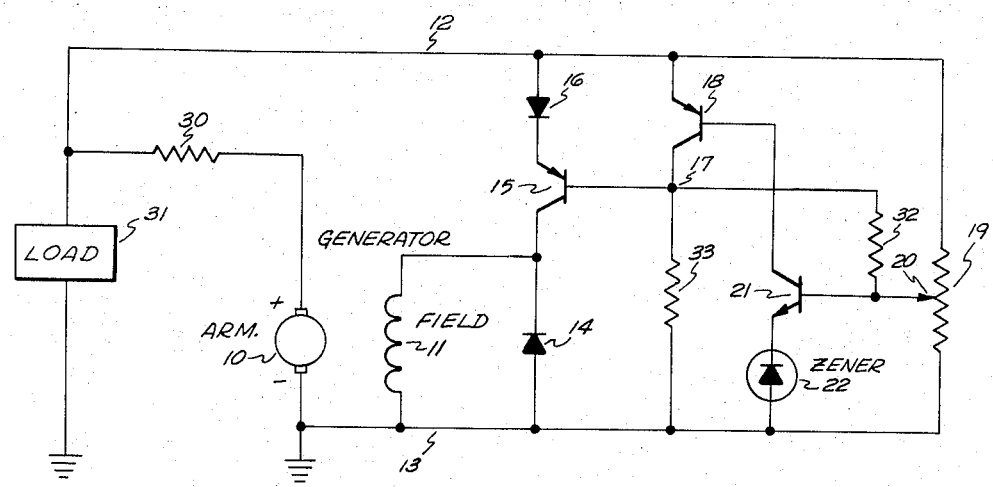
FIGURE 3 shows a circuit diagram of another embodiment of the voltage regulator in accordance with the invention.

FIGURE 1 shows a direct current generator whose voltage is to be regulated and which supplies an electrical system. The generator has an armature 10 (with the indicated polarities) which is rotated by some means not shown, such as an airplane engine for example. The generator also has a separately excited field 11 which may be provided with a freewheeling diode rectifier 14. When rotating, the generator armature 10 supplies direct current to a positive bus 12 and a ground or reference bus 13. These buses 12, 13 are to be connected to a load that is not shown. Current is supplied to the field 11 over a first path comprising a diode rectifier 16 and a PNP type transistor 15 connected between the positive bus 12 and one side of the field 11. The other side of the field 11 is connected to the ground bus 13. A second current path comprising a PNP type transistor 18, an NPN type transistor 21, and a reference Zener diode rectifier 22 is coupled between the positive bus 12 and the ground bus 13. The collector of the transistor 18 is coupled to the base electrode of the transistor 15, this connection being referred to as a junction 17. The junction 17 is coupled to the ground bus 13 through an adjustable potentiometer 19 having a movable tap 20. The tap 20 is coupled to the base electrode of the transistor 21.

The operation of the circuit shown in FIGURE 1 is explained in connection with the waveforms of FIGURES 2a, 2b, 2c, 2d, and 2e which are plotted along a common time axis. As an example, it has been assumed that the nominal or rated voltage of the generator is 28 volts direct current, and that this voltage is to be regulated to within plus or minus 0.25 volt. The movable tap 20 and the Zener diode 22 are set and chosen to provide this regulation. At the time $t_0$, the armature 10 begins to be rotated by some prime mover. The residual magnetism of the field 11 causes the armature voltage to increase or build up as shown in FIGURE 2a between the times $t_0$ and $t_1$. This voltage increase is provided by the transistor 15. Initially, current flows from the positive bus 12 through the diode 16, through the emitter-base path of the transistor 15, and through the potentiometer 19 to the ground bus 13. This current is amplified by the transistor 15 and appears as collector current which is supplied to the field 11. The field voltage and current build up as shown in FIGURES 2d and 2e. This field current causes the voltage on the armature 10 to increase until the assumed 28.25 volts is produced as shown in FIGURE 2a at the time $t_1$. For this voltage, the setting of the movable tap 20 on the potentiometer 19 and the characteristics of the Zener diode 22 permit current to flow from the positive bus 12 through the diode 16, through the emitter-base path of the transistor 15, through the upper portion of the potentiometer 19, through the base-emitter path of the transistor 21, and through the Zener diode 22 to the ground bus 13. This current is amplified by the transistor 21 and appears as collector current for the transistor 21. This collector current is base current for the transistor 18. This base current is amplified by the transistor 18 and appears as collector current for the transistor 18. This collector current tends to make the transistor 21 conduct still more. Thus, it will be seen that the transistors 18, 21 are regeneratively coupled and at the time $t_1$ conduct a large (or saturation) current as shown by FIGURE 2c.

When the transistor 18 is conducting this current, the junction 17 is more positive than the emitter of the transistor 15. (This is because the voltage drop across the diode 16 is greater than the voltage drop across the emitter-collector of the transistor 18.) Therefore, the transistor 15 is cut off as shown in FIGURE 2b, and the voltage is removed from the field 11. As shown in FIGURE 2d at the time $t_1$, the field voltage actually goes slightly negative because of the freewheeling diode 14. Since no external voltage is applied to the field 11, the field current begins to decrease as shown in FIGURE 2e. And the voltage across the armature 10 likewise begins to decrease in a similar manner as shown in FIGURE 2a. At the time $t_2$, the armature voltage has decreased to the assumed 27.75 volts. For this voltage, the setting of the movable tap 20 on the potentiometer 19 and the characteristics of the Zener diode 22 cause the transistors 18, 21 to be turned off as shown in FIGURE 2c. The junction 17 becomes less positive than the emitter of the transistor 15 so that the transistor 15 conducts as shown in FIGURE 2b. The field voltage becomes positive again as shown in FIGURE 2d so that the armature voltage and field current begin to increase or build up again as shown in FIGURES 2a and 2e. As shown in FIGURES 2b and 2d, the collector current of the transistor 15 and the field voltage begin to increase in a similar manner because the transistor 15 is saturated and the armature voltage is rising. At the time $t_3$, the armature voltage again reaches the assumed value of 28.25 volts so that the changes that took place at the time $t_1$ are repeated. At the time $t_4$, the changes that took place at the time $t_2$ are repeated. And, these changes continue at a rate determined by the circuit constants.

Thus, it will be seen that the voltage regulator provides a switching action between the condition of current being supplied to the field 11 during a period of time when the armature voltage is low, and the condition when no current is supplied to the field 11 during a period of time when the armature voltage is high. The time at which this switching takes place is determined by the various circuit values, particularly the breakdown voltage of the Zener diode 22 and the setting of the movable tap 20 on the potentiometer 19. During the time that field current is supplied, the transistor 15 is saturated and the transistors 18, 21 are cut off. During the time that field current is not supplied, the transistor 15 is cut off and the transistors 18, 21 are saturated. Thus, no continuous, high dissipation operation is necessary and the circuit is self-starting and self-contained. Also, the utilization of the junction 17 as a sensing point permits the negative temperature coefficient of the diode 16 and the transistor 15 to be compensated by the positive temperature coefficient of the Zener diode 22.

FIGURE 3 shows another embodiment of the voltage regulator in accordance with the invention. In FIGURE 3, elements similar or identical to those in FIGURE 1 have the same reference numerals. The diagram of FIGURE 3 is particularly useful where there is some appreciable voltage drop between the generator and the load because of line resistance. In FIGURE 3, this resistance is indicated by the resistor 30 coupled between the positive terminal of the armature 10 and the load 31. The positive bus 12 is coupled to the load 31 at the load. This positive bus 12 is coupled to the upper end of the potentiometer 19. It will thus be seen that the base of the transistor 21 is coupled to the movable tap 20 of the potentiometer 19 and is coupled through a resistor 32 to the junction 17. The junction 17 is coupled through a resistor 33 to the ground bus 13. Thus, the conduction of the transistor 21 is determined not only by the voltage on the junction 17 but also by the voltage on the positive bus 12 which is coupled directly to the load 31. When these combined voltages are sufficiently positive to cause the transistor 21 to conduct, regulation takes place by the switching action explained in connection with FIGURE 1.

While only two embodiments of the invention have been shown and described in detail, other embodiments can be provided. For example, various circuit elements including capacitors can be provided to suppress high frequency oscillations which may be undesirable or intolerable. Also, different type transistors can be used if the circuit is appropriately modified. Further, an alternating current generator with a direct current field may be regulated in accordance with the invention if the armature voltage of such a generator can be appropriately rectified. Therefore, while the invention has been described with reference to particular embodiments, it is to be understood that modifications may be made without departing from the spirit of the invention or from the scope of the claims.

What I claim as new and desire to secure by Letters Patent of the United States is:

1. A voltage regulator for a generator having an armature and field comprising: means coupled to said armature for producing a direct current voltage indicative of the voltage produced by said armature; a first current path comprising a first current amplifying device and said field coupled in series and coupled to said voltage producing means; a second current path coupled to said voltage producing means comprising second and third current amplifying devices and voltage reference means, said second and third devices being regeneratively coupled together and coupled to said voltage reference means; and means coupling said second current path to said first current path so that said first current path passes current and said second current path is nonconducting in response to said produced direct current voltage being less than a voltage determined by said voltage reference means and so that said first current path is nonconducting and said second current path passes current in response to said produced direct current voltage being greater than said voltage determined by said voltage reference means.

2. A voltage regulator for a generator having an armature and field comprising: positive and reference buses adapted to be coupled to said armature for producing a direct current voltage indicative of the voltage produced by said armature; a first current path comprising a rectifier, a first transistor, and said field coupled in series between said positive bus and said reference bus; a second current path comprising a second transistor, a third transistor, and a reference device, said second and third transistors being regeneratively coupled to each other and coupled in series with said reference device between said positive bus and said reference bus; and means coupling the collector of said second transistor to the base of said first transistor so that said first current path supplies current to said field in response to said produced direct current voltage being less than a magnitude determined by said reference device and so that said first current path is nonconducting in response to said produced direct current voltage being greater than the voltage determined by said reference device.

3. A voltage regulator for a generator having an armature and field comprising; a positive bus and a reference bus adapted to be coupled to said armature for producing a direct current voltage indicative of the voltage produced by said armature; a first current path comprising a rectifier, a first transistor, and said field coupled in a series circuit in that order between said positive bus and said reference bus; a second current path comprising a second transistor, a third transistor, and a voltage reference device regeneratively coupled between said positive bus and said reference bus; an adjustable impedance coupled between the base of said third transistor and said reference bus; an impedance coupled between said base of said third transistor and said collector of said second transistor; and means coupling said collector of said second transistor to the base of said first transistor.

References Cited

UNITED STATES PATENTS 3,121,837  2/1964  Holm et al. _____ 322—28
3,253,210  2/1966  Cummins _____ 322—28

MILTON O. HIRSHFIELD, *Primary Examiner.*

J. D. TRAMMELL, *Assistant Examiner.*